United States Patent
Dutton

(10) Patent No.: US 7,889,177 B2
(45) Date of Patent: Feb. 15, 2011

(54) COMPUTER INPUT DEVICE AND METHOD OF USING THE DEVICE

(75) Inventor: David Thomas Dutton, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1051 days.

(21) Appl. No.: 11/546,357

(22) Filed: Oct. 12, 2006

(65) Prior Publication Data

US 2008/0088584 A1 Apr. 17, 2008

(51) Int. Cl.
*G06F 3/033* (2006.01)

(52) U.S. Cl. ............... 345/157; 345/156; 345/169; 715/825

(58) Field of Classification Search ......... 345/156–173; 715/825–829
See application file for complete search history.

(56) References Cited

U.S. PATENT DOCUMENTS

| 4,566,000 | A * | 1/1986 | Goldman et al. | 715/861 |
| 6,614,419 | B1 * | 9/2003 | May | 345/156 |
| 7,249,325 | B1 * | 7/2007 | Donaldson | 715/777 |
| 2002/0135561 | A1 * | 9/2002 | Rojewski | 345/156 |
| 2003/0095155 | A1 | 5/2003 | Johnson | |
| 2005/0007343 | A1 | 1/2005 | Butzer | |
| 2006/0068704 | A1 * | 3/2006 | Bhakta et al. | 455/41.2 |
| 2006/0114224 | A1 * | 6/2006 | Ninomiya | 345/157 |
| 2006/0146009 | A1 * | 7/2006 | Syrbe et al. | 345/156 |
| 2006/0186197 | A1 * | 8/2006 | Rosenberg | 235/380 |
| 2007/0236451 | A1 * | 10/2007 | Ofek et al. | 345/157 |

OTHER PUBLICATIONS

Vodafone K.K. Press Release entitled Vodafone K.K. unveils Japan's first motion-recognition mobile and new handset with self-activating TV dated Jan. 31, 2005.

* cited by examiner

*Primary Examiner*—Kimnhung Nguyen

(57) ABSTRACT

A hand-held device includes a display, a position sensor, a communication port operable to receive screen image data, and a processor. The processor is operable to determine a new cursor position in response to a change of position detected by the position sensor. The processor is additionally operable either to display on the display a window of an image positionally referenced to the new cursor position in response to screen image data when the hand-held device is operated in a remote mode. Alternatively, the processor is operable to display on the display a local image in response to local image data and a cursor icon overlaid on the local image when the hand-held device is operated in a local mode. The image displayed represents a fractional portion of the local image data, and the fractional portion is selected in response to the new cursor position.

15 Claims, 6 Drawing Sheets

COMPUTER INPUT DEVICE AND METHOD OF USING THE DEVICE

BACKGROUND

Controlling a computer display with a human pointed input device, such as a computer mouse, is an indirect process. Conventionally, the user's hand moves the mouse on a planar surface, and the response is feedback on a viewing plane, i.e. a display. It takes time to get used to the relationship between the mechanism of movement, e.g., the mouse, and the visual response on the viewing plane. Experience improves the relationship, but the accuracy is still limited as when someone tries to draw or write one's own name with a computer mouse.

In addition, display screens need to be large to show lots of data. Large screens can be costly and consume energy. Many graphic oriented programs, such as a drawing or paint program, require a user selection of work tools for drawing, modifying, selecting pen widths, selecting colors, etc. Such work tools are commonly organized on a toolbar. Such toolbars encroach on the workspace available for graphics creation on each given display screen. Thus, even larger display screens are required to see the desired level of detail.

Large displays are often difficult to use in confined working spaces (e.g. airplane drop down trays). For example, if the traveler tries to get some work done using his/her laptop computer while on a crowded aircraft, the traveler must set up the laptop computer with a cable connected to the computer mouse on the small drop down tray table on the aircraft which generally has insufficient room for both the laptop computer and its mouse. Integrated track pads are now often used, however their feedback response is inferior to that of a separate mouse. Also, with regard to confined working spaces, large displays are not private, and confidential information can be seen easily within a relatively large radius in front of the display.

Also, modern travelers often carry a brief case full of electronic equipment such as a laptop computer, a computer mouse, a removable data storage device (e.g., floppy disk drive, CD burner, etc.) with a pigtail cable to the computer, a cell phone, a personal digital assistant (PDA), etc., and a power converter and recharger for each. A cell phone might be adapted for use as a computer mouse to save on the number of devices. U.S. Patent Publication 2005/0007343 of Butzer describes a cell phone mouse that incorporates some of the computer mouse functions in a cell phone.

SUMMARY

A hand-held device includes a display, a position sensor, a communication port operable to receive screen image data, and a processor. The processor is operable to determine a new cursor position in response to a change of position detected by the position sensor. The processor is additionally operable either to display on the display a window of an image positionally referenced to the new cursor position in response to screen image data when the hand-held device is operated in a remote mode. Alternatively, the processor is operable to display on the display a local image in response to local image data and a cursor icon overlaid on the local image when the hand-held device is operated in a local mode. The image displayed represents a fractional portion of the local image data, and the fractional portion is selected in response to the new cursor position.

A method of using a hand-held device with a display includes determining a new cursor position in response to a change of position of the hand-held device, and determining screen image data representing a window of an image. The window is positionally referenced to the new cursor position. The method further includes displaying the window of the image on the display in response to the screen image data when the hand-held device is operated in a remote mode. Alternatively, the method further includes displaying on the display an image in response to local image data and a cursor icon overlaid on the image when the hand-held device is operated in a local mode. The image displayed represents a fractional portion of the local image data, and the fractional portion is selected in response to the new cursor position.

In further examples, the processor of the hand-held device is regarded as part of a machine that also includes a display, a position sensor, a communication port and a machine-readable medium. The machine-readable medium includes sets of instructions operable in the machine to cause the processor to perform operations of the several methods discussed herein.

BRIEF DESCRIPTION OF DRAWINGS

The invention will be described in detail in the following description of preferred embodiments with reference to the following figures.

DETAILED DESCRIPTION

Figure 1:
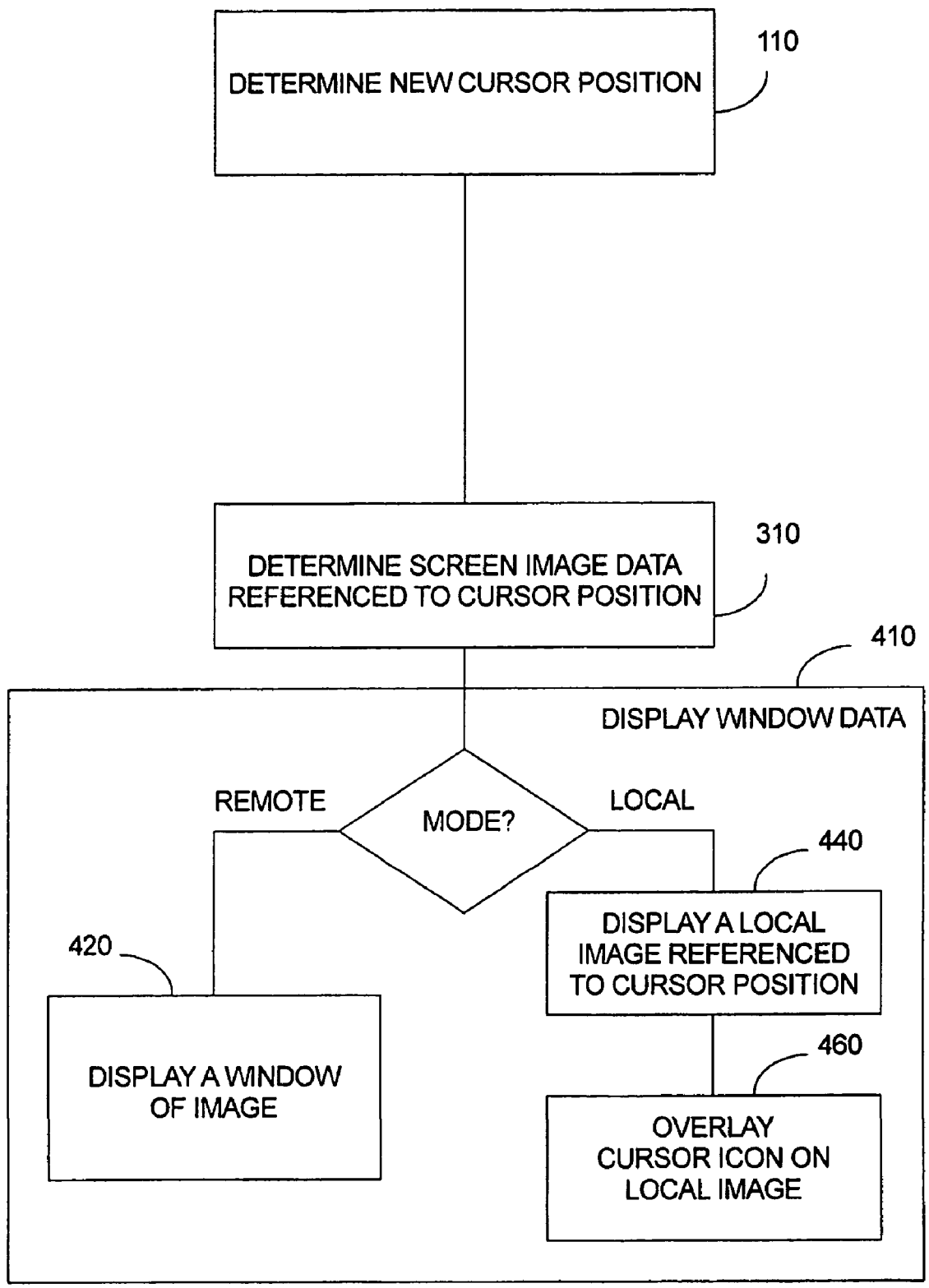
FIG. 1 is a flow chart of an example of a method of the invention.

The invention relates to integration of an auxiliary display into a computer input device. Such a computer input device with auxiliary display can feedback a smaller window of a larger display (virtual or physical). The invention relates to a device and a method of using the device that involves a display, a processor, memory, input from buttons and movement sensors. A direct 1:1 relationship between position movement and change in the auxiliary display image gives the user greater pointing control and is limited only by the stored image data. This device can be used to augment or replace a larger physical display of a remote computer. It can also be incorporated with other hand held functionality (cell phone, GPS or media player) for a stand alone unit to open up a large screen of information relating to the local functionality.

In the case of a mouse as the computer input device, as the device is moved the display integrated into the mouse shows a window (i.e., a subset) of the display data that also moves. Movement of the mouse directly correlates to displaying a moving content within the window displayed on the auxiliary display of the mouse. The moving content so displayed is dependant upon motion of the mouse. Motion actuation and window display are preferably, but not necessarily, calibrated to give a 1:1 relationship between the motion of the input device and the change in window display, giving the illusion that the computer input device converts a flat surface into a large screen at the point of the open window. This 1:1 relationship helps to replicate a large display, such as that for fine detail work, such as drawing or handwriting input data. The user may rely on the 1:1 relationship of the auxiliary display for improved accuracy of the display's response to movement.

The auxiliary display can also be used to augment the main computer system display with extra display information that, because of the display of the computer input device, need not be shown on the main computer system display, such as toolbars, menus or workspaces. The need for a much larger primary display is thereby reduced, and the cost and energy consumption are also reduced. In both cases, the information to be displayed is larger than the content of the window, motion changes the window content and opens up to all areas of the larger content. In confined working conditions or for privacy consideration a small auxiliary display can be used only and hence can replace the large display.

The invention involves a display, a processor, memory, input from buttons and movement sensors. Several of these properties are communal with other hand held devices, such as cell phones, media player, PDAs, and GPS systems. The combination of these devices offer the opportunity to decrease the number of devices on the road. In the case of a cell phone, media player, PDA or GPS system, the use of a small window to gain access to larger content can also be used to gain access to the internal content of the cell phone, media player, PDA or GPS system, improving the user experience of these devices.

A hand-held device includes a display, a position sensor, a communication port operable to receive screen image data, and a processor. The processor is operable to determine a new cursor position in response to a change of position detected by the position sensor. Additionally, the processor is operable to display on the display a window of an image positionally referenced to the new cursor position in response to screen image data when the hand-held device is operated in a remote mode. Alternatively, the processor is operable to display on the display a local image in response to local image data and a cursor icon overlaid on the local image when the hand-held device is operated in a local mode. The local image displayed represents a fractional portion of the local image data that is selected in response to the new cursor position. Representing a fractional portion of the local image data, the local image displayed moves under the overlaid cursor icon in response to changing positions of the position sensor.

In an example of the hand-held device, the hand-held device is coupled to a computer system. The processor is additionally operable to send the new cursor position to the computer system and to receive the screen image data from the computer system.

In a variant of this example, an apparatus that includes such a hand-held device, also includes the computer system. The computer system is operable to generate the screen image data based on the new cursor position and to send the screen image data to the hand-held device.

In an embodiment of this variant, the screen image data from the computer system includes either on-screen image data or off-screen image data or both. The computer system is operable to select the screen image data from the on-screen image data when the computer system is operated in an on-screen mode. The computer system is operable to select the screen image data from the off-screen image data when the computer system is operated in an off-screen mode. The computer system is also operable to send the selected screen image data to the hand-held device.

In an example of this embodiment, the computer system is further operable to send an identification that the computer system is operating in either the on-screen mode or the off-screen mode.

In FIG. 1, a method of using a hand-held device with a display includes at 110 determining a new cursor position in response to a change of position of the hand-held device, and at 310 determining screen image data representing a window of an image. The window is positionally referenced to the new cursor position. The method further includes at 410, 420 displaying the window of the image on the display in response to the screen image data when the hand-held device is operated in a remote mode. Alternatively, the method further includes at 410, 440, 460 displaying on the display an image in response to local image data and a cursor icon overlaid on the image when the hand-held device is operated in a local mode. The image displayed represents a fractional portion of the local image data. The fractional portion is selected in response to the new cursor position. Representing a fractional portion of the local image data, the local image displayed moves under the overlaid cursor icon in response to changing positions of the hand-held device.

Figure 2:
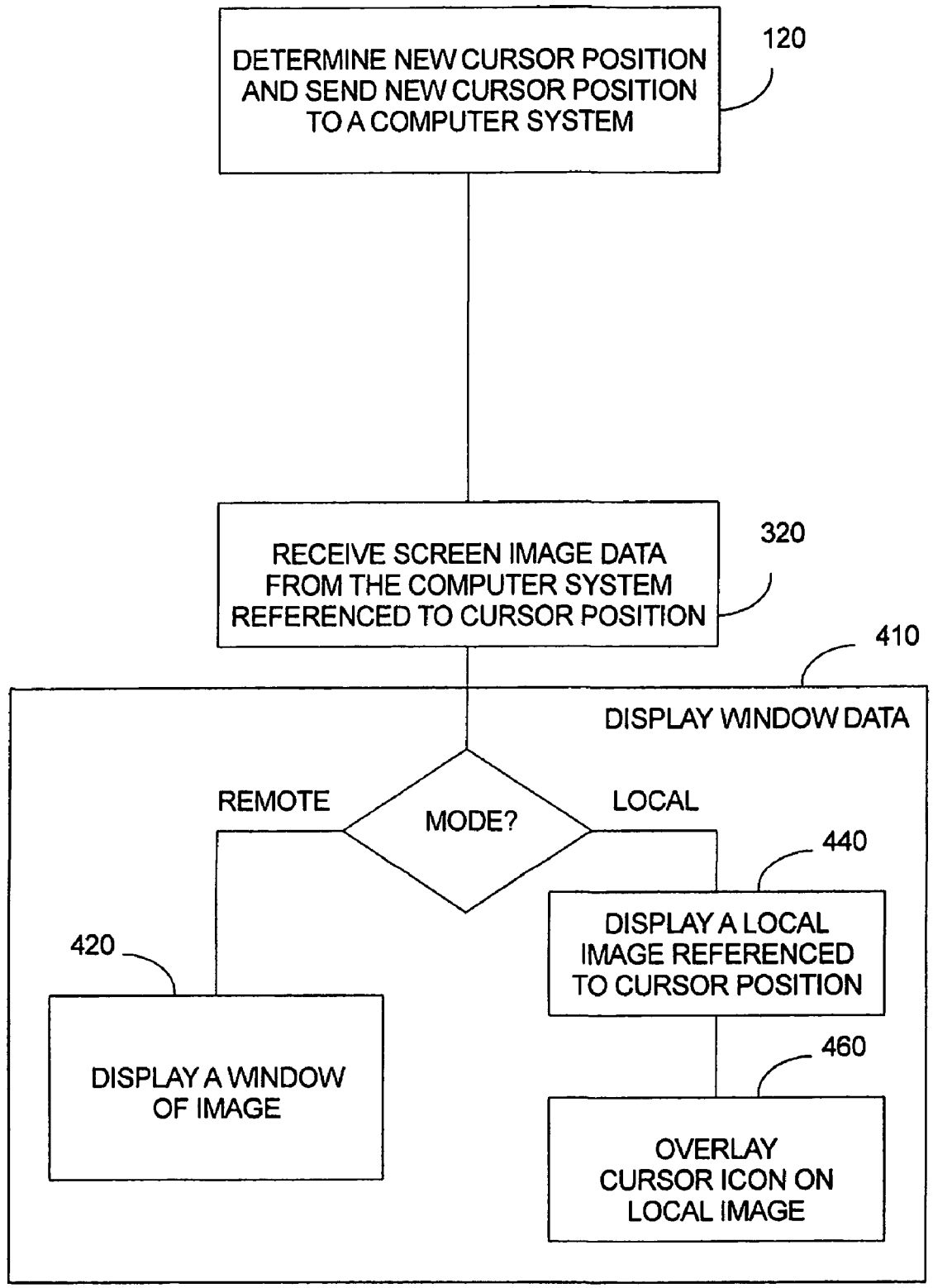
FIG. 2 is a flow chart of another example of a method of the invention.

In FIG. 2, an example of this method, the hand-held device is coupled to a computer system. The determining of a new cursor position includes at 120 sending the new cursor position to the computer system. At 320 the determining of the screen image data includes receiving the screen image data from the computer system.

Figure 3:
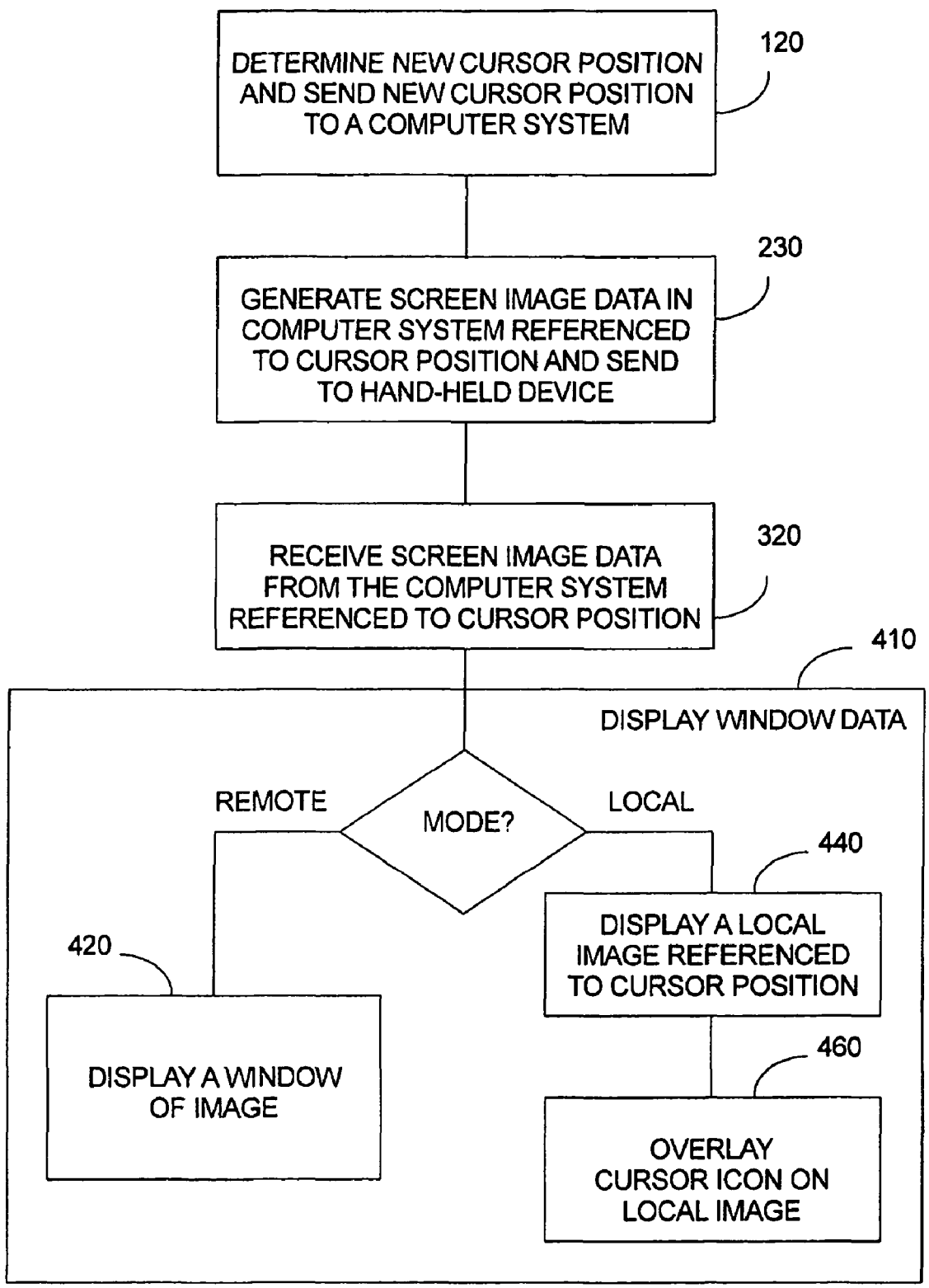
FIG. 3 is a flow chart of still another example of a method of the invention.

In FIG. 3, a variant of this example, the method further includes at 230 generating the screen image data in the computer system based on the new cursor position and sending the screen image data to the hand-held device.

Figure 4:
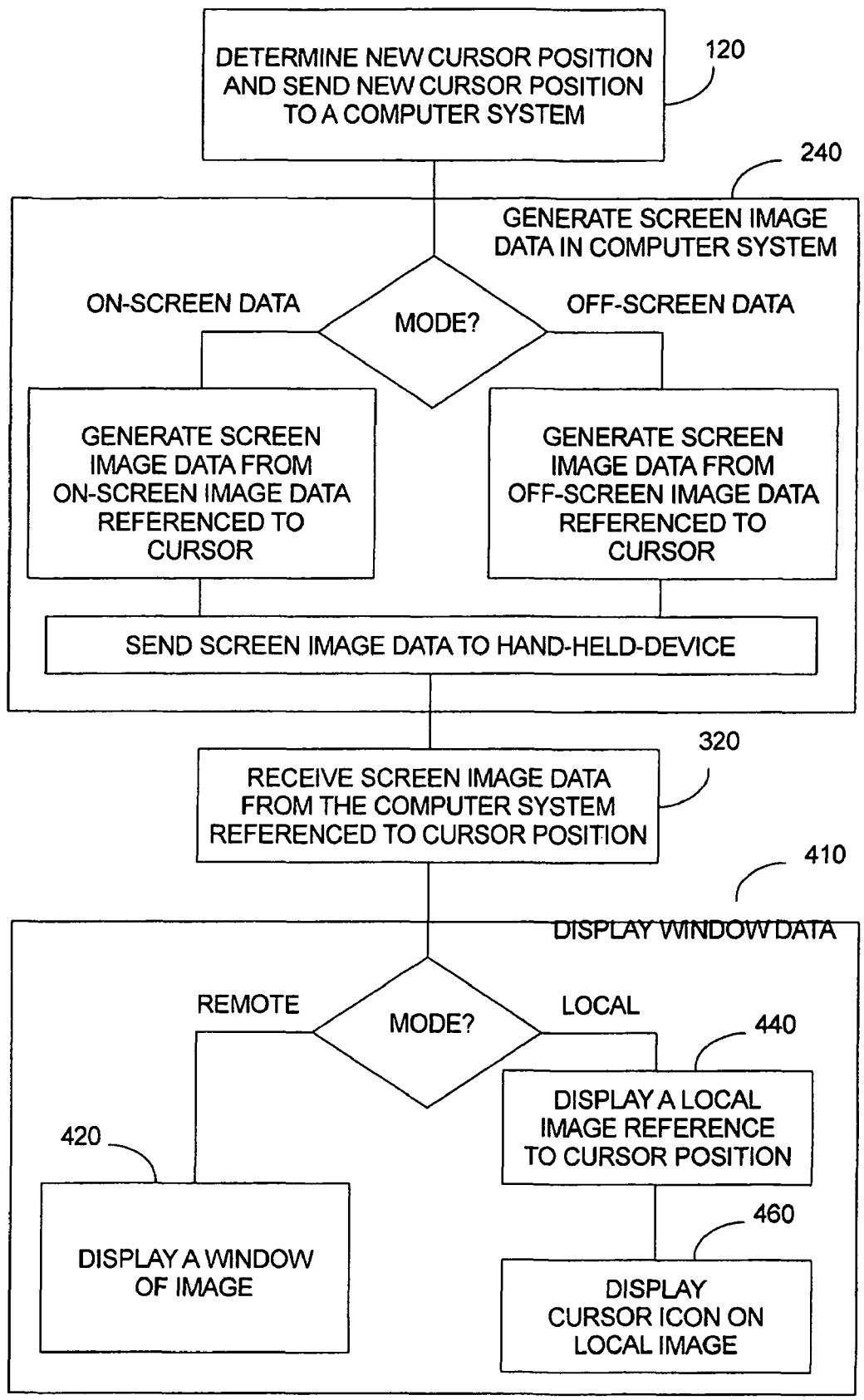
FIG. 4 is a flow chart of yet another example of a method of the invention.

In FIG. 4, an embodiment of this variant, the screen image data includes either on-screen image data or off-screen image data or both. At 240, the generating includes selecting the screen image data from the on-screen image data when the computer system is operated in an on-screen mode. The generating at 240 also includes selecting the screen image data from the off-screen image data when the computer system is operated in an off-screen mode.

Figure 5:
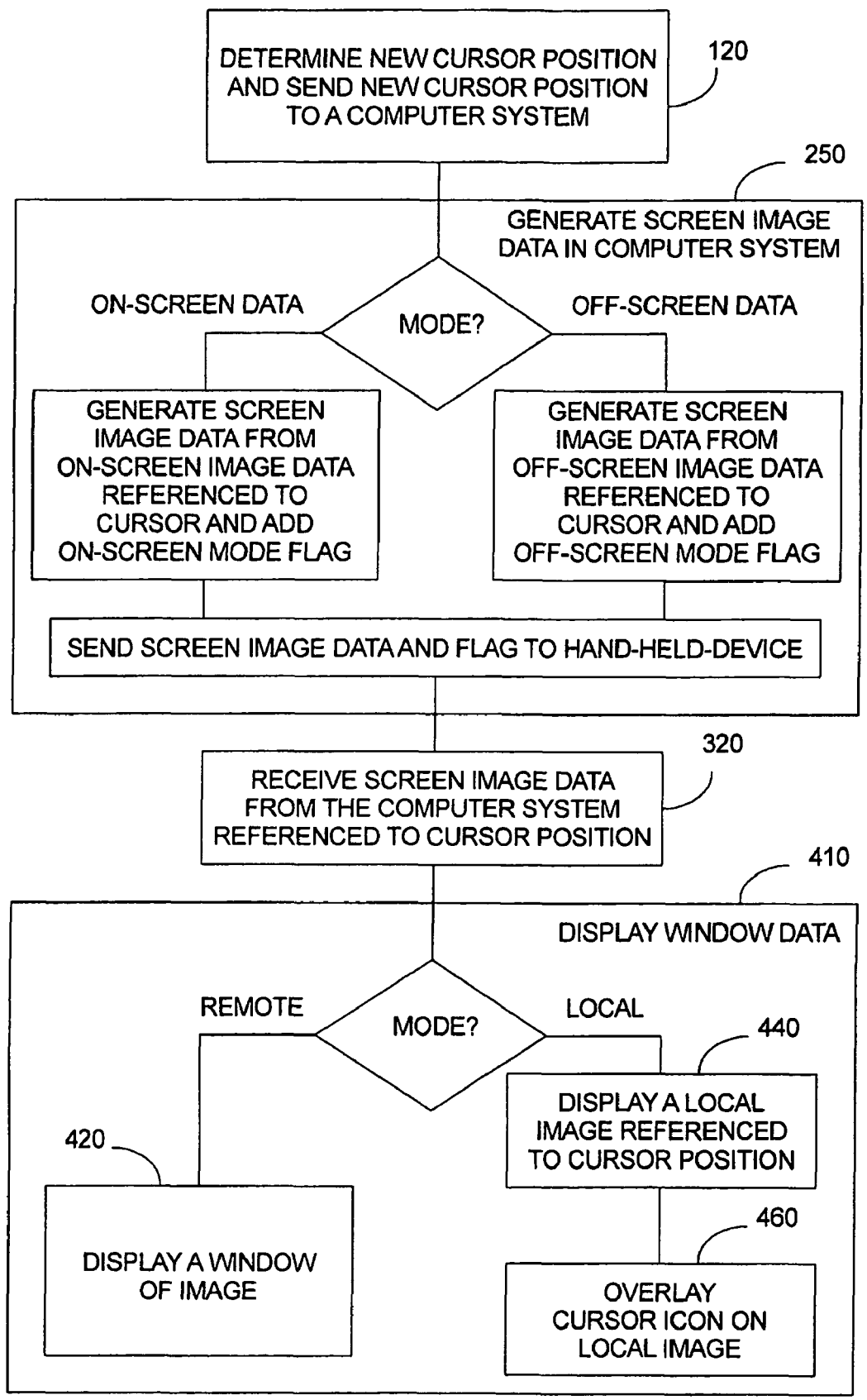
FIG. 5 is a flow chart of a further example of a method of the invention.

In FIG. 5, an example of this embodiment, the sending of the screen image data to the hand held device includes at 250 sending an identification that the computer system is operating in either the on-screen mode or the off-screen mode.

Figure 6:
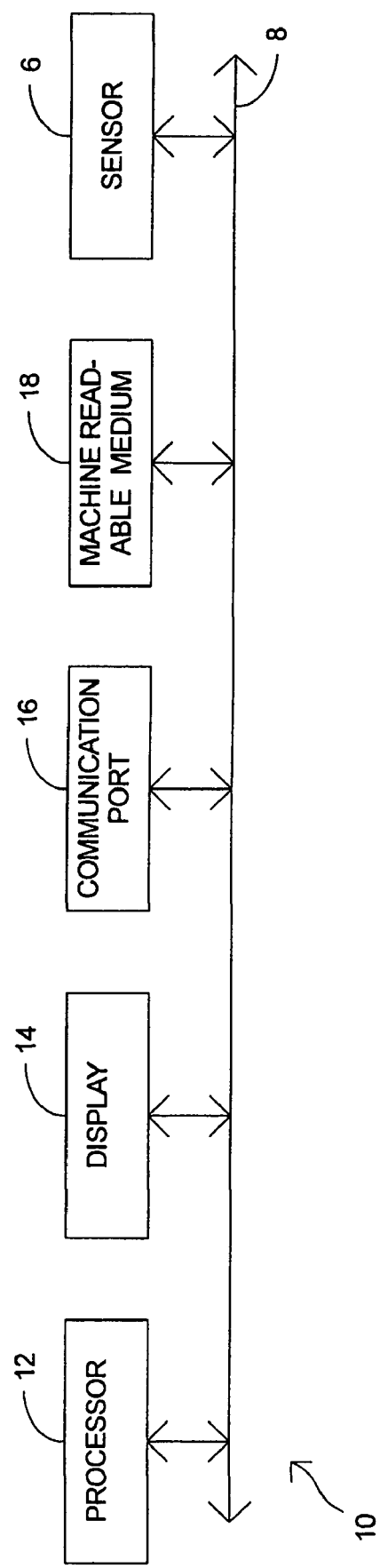
FIG. 6 is a functional block diagram of representative hand-held device of the invention.

In FIG. 6, in further examples of the invention, processor 12 of hand-held device 10 is regarded as part of a machine that also includes display 14, position sensor 6, communication port 16 and a machine-readable medium 18 all connected together over bus 8. Examples of the machine readable medium includes a ROM, a RAM, a CD, a DVD, a floppy disk, a hard disk drive or any other machine readable medium. The machine-readable medium includes sets of instructions operable in the machine to cause the processor to perform operations of the several methods discussed herein.

In further examples of the invention, the computer system includes a machine-readable medium that in turn includes sets of instructions operable in the computer system to cause the computer system to perform operations of the several methods discussed herein.

Collectively, the medium operable in the hand-held device and the medium operable in the computer system constitute machine-readable media.

Having described preferred embodiments of a novel hand held device and method of using such a device (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

What is claimed is:

1. A method of using a hand-held device comprising a display, the method comprising:

determining a new cursor position in response to a change of position of the hand-held device;

determining screen image data representing a window of an image, the window being positionally referenced to the new cursor position;

displaying the window of the image on the display of the hand-held device in response to the screen image data when the hand-held device is operated in a remote mode, wherein the display of the hand-held device is connected to a bus along with a processor of the hand-held device; and displaying on the display of the hand-held device an image in response to local image data and a cursor icon overlaid on the image when the hand-held device is operated in a local mode, the image displayed representing a fractional portion of the local image data that is selected in response to the new cursor position.

2. A method according to claim 1, wherein:

the hand-held device is coupled to a computer system;

the determining of a new cursor position includes sending the new cursor position to the computer system; and the determining of the screen image data includes receiving the screen image data from the computer system.

3. A method according to claim 2, further comprising:

generating the screen image data in the computer system based on the new cursor position; and sending the screen image data to the hand-held device.

4. A method according to claim 3, wherein:

the screen image data comprises at least one of on-screen image data and off-screen image data;

the generating comprises selecting the screen image data from the on-screen image data when the computer system is operated in an on-screen mode; and the generating comprises selecting the screen image data from the off-screen image data when the computer system is operated in an off-screen mode.

5. A method according to claim 4, wherein the sending of the screen image data to the hand held device includes sending an identification that the computer system is operating in one of the on-screen mode and the off-screen mode.

6. A hand-held device comprising:

a display;

a position sensor;

a communication port operable to receive screen image data; and a processor operable to determine a new cursor position in response to a change of position detected by the position sensor, the processor being additionally operable to display on the display a window of an image positionally referenced to the new cursor position in response to screen image data when the hand-held device is operated in a remote mode and to display on the display a local image in response to local image data and a cursor icon overlaid on the local image when the hand-held device is operated in a local mode, the local image displayed representing a fractional portion of the local image data that is selected in response to the new cursor position, wherein the display, the position sensor, the communication port and the processor of the hand-held device are connected together over a bus.

7. A hand-held device according to claim 6, wherein:

the hand-held device is coupled to a computer system;

the processor is additionally operable to send the new cursor position to the computer system and to receive the screen image data from the computer system.

8. An apparatus that includes a hand-held device according to claim 7 and the computer system, wherein the computer system is operable to generate the screen image data based on the new cursor position and to send the screen image data to the hand-held device.

9. An apparatus according to claim 8, wherein:

the screen image data from the computer system comprises at least one of on-screen image data and off-screen image data;

the computer system is operable to select the screen image data from the on-screen image data when the computer system is operated in an on-screen mode, to select the screen image data from the off-screen image data when the computer system is operated in an off-screen mode, and to send the selected screen image data to the hand-held device.

10. An apparatus according to claim 9, wherein the computer system is further operable to send an identification that the computer system is operating in one of the on-screen mode and the off-screen mode.

11. A machine-readable medium comprising sets of instructions operable in a machine comprising a processor, a display, a position sensor and a communication port, a first collection of the sets of instructions being operable to cause the processor to perform operations comprising:

determining a new cursor position in response to a change of position of the machine;

determining screen image data representing a window of an image, the window being positionally referenced to the new cursor position;

displaying the window of the image on the display of the machine in response to the screen image data when the machine is operated in a remote mode, wherein the display of the machine is connected to a bus along with the processor of the machine; and displaying on the display of the machine a local image in response to local image data and a cursor icon overlaid on the image when the machine is operated in a local mode, the local image displayed representing a fractional portion of the local image data that is selected in response to the new cursor position.

12. A machine-readable medium according to claim 11, wherein:

the machine is coupled to a computer system;

the determining of a new cursor position includes sending the new cursor position to the computer system; and the determining of the screen image data includes receiving the screen image data from the computer system.

13. Machine-readable media according to claim 12, additionally comprising a medium that includes a second collection of the sets of instructions, the second collection being operable to cause the computer system to perform operations comprising:

generating the screen image data in the computer system based on the new cursor position; and sending the screen image data to the machine.

14. Machine-readable media according to claim 13, wherein:

the screen image data comprises at least one of on-screen image data and off-screen image data;

the generating comprises selecting the screen image data from the on-screen image data when the computer system is operated in an on-screen mode; and the generating comprises selecting the screen image data from the off-screen image data when the computer system is operated in an off-screen mode.

15. Machine-readable media according to claim 14, wherein the sending of the screen image data to the machine includes sending an identification that the computer system is operating in one of the on-screen mode and the off-screen mode.

* * * * *